United States Patent
Hassan et al.

(10) Patent No.: US 6,821,090 B1
(45) Date of Patent: Nov. 23, 2004

(54) GUST ALLEVIATION/FLUTTER SUPPRESSION DEVICE

(75) Inventors: Ahmed A. Hassan, Mesa, AZ (US); Brian K. Hamilton, Mesa, AZ (US); Hieu T. Ngo, Mesa, AZ (US)

(73) Assignee: McDonnell Douglas Helicopter Company, Mesa, AZ (US)

( * ) Notice: Subject to any disclaimer, the term of this patent is extended or adjusted under 35 U.S.C. 154(b) by 0 days.

(21) Appl. No.: 09/226,418

(22) Filed: Jan. 6, 1999

Related U.S. Application Data

(63) Continuation-in-part of application No. 08/869,725, filed on Jun. 5, 1997, now Pat. No. 6,092,990, which is a continuation-in-part of application No. 08/869,372, filed on Jun. 5, 1997, now Pat. No. 5,938,404.
(60) Provisional application No. 60/071,142, filed on Jan. 12, 1998, and provisional application No. 60/071,140, filed on Jan. 12, 1998.

(51) Int. Cl.$^7$ .............................................. B64C 27/04
(52) U.S. Cl. ..................... 416/42; 416/3; 416/90 A; 416/91; 416/500; 415/119; 244/130; 244/199; 244/203; 244/204; 244/208
(58) Field of Search ................ 416/3, 23, 24, 416/90 R, 90 A, 91, 42, 20 R, 155, 500; 415/119, 181, 914; 244/198, 199, 203, 204, 207, 208, 130; 239/265.33, 265.35, 265.23

(56) References Cited

U.S. PATENT DOCUMENTS

| | | | | |
|---|---|---|---|---|
| 3,055,614 A | | 9/1962 | Thompson | |
| 3,588,273 A | * | 6/1971 | Kizilos | 416/90 A |
| 4,516,747 A | * | 5/1985 | Lurz | 244/204 |
| 4,802,642 A | * | 2/1989 | Mangiarotty | 244/204 |
| 4,989,810 A | * | 2/1991 | Meier et al. | 244/208 |
| 5,335,885 A | | 8/1994 | Bohning | |
| 5,529,458 A | * | 6/1996 | Humpherson | 416/20 R |
| 5,588,800 A | | 12/1996 | Charles et al. | |
| 5,758,823 A | * | 6/1998 | Glezer et al. | 239/4 |
| 5,791,601 A | * | 8/1998 | Dancila et al. | 244/207 |
| 5,803,410 A | | 9/1998 | Hwang | |
| 5,806,808 A | * | 9/1998 | O'Neil | 244/208 |
| 5,813,625 A | | 9/1998 | Hassan et al. | |
| 5,938,404 A | * | 8/1999 | Domzalski et al. | 416/91 |
| 6,543,719 B1 | * | 4/2003 | Hassan et al. | 416/90 A |

FOREIGN PATENT DOCUMENTS

SU  1761973  * 9/1992 ............... 416/90 R

* cited by examiner

*Primary Examiner*—Christopher Verdier
(74) *Attorney, Agent, or Firm*—Stout, Uxa, Buyan & Mullins, LLP; Donald E. Stout

(57) ABSTRACT

An active control device is disclosed comprising an array of actively controlled oscillating air jets disposed on an aircraft structure. In a preferred embodiment, the device senses parameters associated with incipient unsteady aerodynamic excitation, such as free stream gusts, shed wakes in rotor and turbomachinery flows, or oscillatory motion of trailing edge control surfaces such as ailerons. These parameters are provided as input signals to a processor. Based on the input signals, the processor generates output signals that are used to operate the air jet array in a manner counteractive to the unsteady forcing. The air jet array can be used on numerous aircraft structures, including rotor blades, wings, engine inlets, engine exhausts, blunt surfaces and nozzles.

7 Claims, 7 Drawing Sheets

GUST ALLEVIATION/FLUTTER SUPPRESSION DEVICE

This application claims the benefit of Provisional Application No. 60/071,140 titled ZERO-MASS AIR JETS FOR CONTROL AND BVI NOISE REDUCTION, filed Jan. 12, 1998; and Provisional Application No. 60/071,142 titled REDUCING SHOCK WAVE STRENGTH/HSI NOISE USING ZERO-MASS JETS, filed Jan. 12, 1998; the contents of which are incorporated herein by reference.

This application is a continuation-in-part of U.S. application Ser. No. 08/869,725, filed Jun. 5, 1997 and now U.S. Pat. No. 6,092,990, titled OSCILLATING AIR JETS FOR HELICOPTER ROTOR AERODYNAMIC CONTROL AND BVI NOISE REDUCTION; and U.S. application Ser. No. 08/869,372, filed Jun. 5, 1997 and now U.S. Pat. No. 5,938,404, titled OSCILLATING AIR JETS ON AERODYNAMIC SURFACES; both of which are commonly assigned and the contents of which are expressly incorporated herein by reference.

This application is related to U.S. application Ser. No. 08/251,329 filed May 31, 1994 and titled BLADE VORTEX INTERACTION NOISE REDUCTION TECHNIQUES FOR A ROTORCRAFT, which issued as U.S. Pat. No. 5,588,800; U.S. application Ser. No. 08/727,980 filed Oct. 9, 1996 (now U.S. Pat. No. 5,813,625 issued Sep. 29, 1998) and titled ACTIVE BLOWING SYSTEM FOR ROTORCRAFT VORTEX INTERACTION NOISE REDUCTION; and co-pending U.S. application Ser. No. 08/869,372 filed Jun. 5, 1997 and titled OSCILLATING AIR JETS ON AERODYNAMIC SURFACES; all of which are commonly assigned and the contents of which are incorporated herein by reference.

FIELD OF THE INVENTION

The present invention relates generally to aerodynamic surfaces and, more particularly, to improved constructions and control schemes for such surfaces that provide aerodynamic control and significant reduction of the negative effects of non-uniform flow over such surfaces.

BACKGROUND OF THE INVENTION

Aerodynamically-driven oscillations (ADO) have long been recognized as one of the more serious problems facing the structural integrity and maintainability of aerospace vehicle components such as fixed wings and rotor blades. ADO can, when coupled with the natural frequencies of the component, result in resonance causing large deformations and, consequently, the rapid fatigue of the component. Component fatigue, in turn, results in a shorter life cycle and, in severe conditions, can cause failure of the component.

Aerodynamically-driven oscillations of structural components cause a phenomenon known as flutter. Flutter can occur over a wide range of operating conditions spanning the lower end of subsonic flow up to trasonic flow. In the absence of ADO, aerospace vehicle components are more tolerant to variations in their design, operating conditions and, more importantly, less susceptible to costly structural failures and repairs. Accordingly, flutter suppression technology is highly sought after by an aerospace community faced with escalating costs of component production and maintainability.

Among the known factors directly affecting the intensity of ADO are the magnitude and frequency parameters of unsteady aerodynamic forces (e.g., shed wakes or free stream gusts) to which the component is subjected. To suppress the onset of flutter, these forcing parameters can be affected using an active control technique. A common prior art device used for gust alleviation and the suppression of flutter is an active trailing edge aileron-like control surface. The oscillatory motion of the controller is desirably 180 degrees out of phase with the unsteady motion caused by the aerodynamic forcing. However, this control technique requires the use of a mechanical actuator and linkages to control the motion of the aileron-like surface. Further, aileron-like surfaces necessarily introduce aerodynamic surface discontinuities that undermine aerodynamic efficiencies and increase the radar cross-section signature of the aircraft.

Accordingly, what is needed in the art is a device that will suppress the onset of flutter in an aircraft component while minimizing or eliminating associated moving parts and discontinuities of the component surface.

SUMMARY OF THE INVENTION

According to principles of the present invention, an active control device is disclosed comprising an array of actively controlled oscillating air jets disposed on an aircraft structure. In a preferred embodiment, the device senses parameters associated with incipient unsteady aerodynamic excitation, such as free stream gusts, shed wakes in rotor and turbomachinery flows, or oscillatory motion of trailing edge control surfaces such as ailerons. These parameters are provided as input signals to a processor. Based on the input signals, the processor generates output signals that are used to operate the air jet array in a manner counteractive to the unsteady forcing. The air jet array can be used on numerous aircraft structures, including rotor blades, wings, engine inlets, engine exhausts, blunt surfaces and nozzles.

BRIEF DESCRIPTION OF THE DRAWING

The invention will be better understood from a reading of the following detailed description taken in conjunction with the drawing figures in which like reference designators are used to designate like elements, and in which.

DETAILED DESCRIPTION OF THE PREFERRED EMBODIMENT

Figure 1:
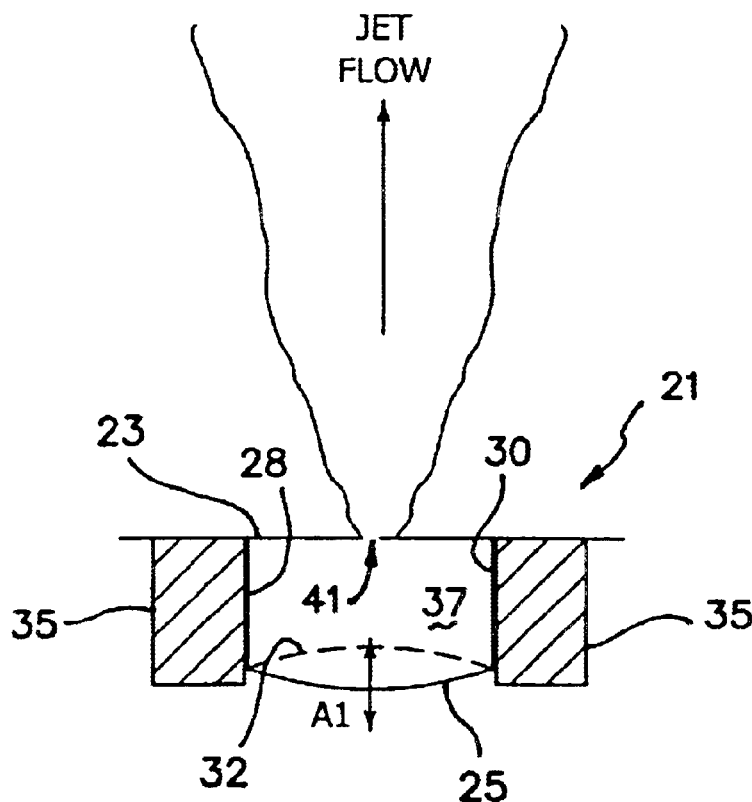
FIG. 1 is a cross-sectional view of an oscillating air jet actuator in accordance with the present invention.

The drawing figures are intended to illustrate the general manner of construction and are not to scale. In the description and in the claims the terms left, right, front and back and the like are used for descriptive purposes. However, it is to be understood that the embodiment of the invention described herein is capable of operation in other orientations than are shown and the terms so used are only for the purpose of describing relative positions and are interchangeable under appropriate circumstances.

FIG. 1 illustrates an oscillating air jet actuator 21 (also known as a zero-net-mass jet ("ZNMJ")) incorporating principles of the present invention and disposed on an aerodynamic surface 23. Air jet actuator 21 comprises a diaphragm 25 formed of a piezoelectric material. Diaphragm 25 is preferably supported between a first conductor 28 and a second conductor 30. Diaphragm 25 is reciprocatably movable in the directions of arrows A1 between a first position indicated by the reference numeral 25 and a second position indicated by the phantom lines 32.

A frame 35 secures first conductor 28 and second conductor 30 to _aerodynamic surface 23. An oscillating current is provided to diaphragm 25 via first conductor 28 and second conductor 30 to thereby electrically stimulate diaphragm 25 to oscillate in the directions of arrows A1. Frame 35 and diaphragm 25 combine to form a sealed chamber 37 having a common wall with aerodynamic surface 23.

An aperture 41 is formed in aerodynamic surface 23 to facilitate movement of air out of and into sealed chamber 37 in response to positive and negative pressures generated within sealed chamber 37 by diaphragm 25. When diaphragm 25 moves in a direction toward aerodynamic surface 23, a positive pressure is produced within sealed chamber 37 resulting in a flow of air out of aperture 41. Conversely, when diaphragm 25 moves away from aerodynamic surface 23, a negative pressure within sealed chamber 37 is established and, consequently, air is drawn into sealed chamber 37 through aperture 41.

The alternation of air into and out of sealed chamber 37 through aperture 41 may be referred to as a zero-net-mass jet, for the net mass of air flow into and out of aperture 41 is equal to zero during one complete oscillation cycle of diaphragm 25. Because the airflow in and out of aperture 41 has an associated momentum, the zero net mass flow through aperture 41 does have a net effect on the airstream at locations external of aperture 41. Thus, the zero net mass flow through aperture 41 may be used to suppress aerodynamically driven oscillations and/or affect gross lift and drag of an aerodynamic surface as hereinafter described.

Figure 2:
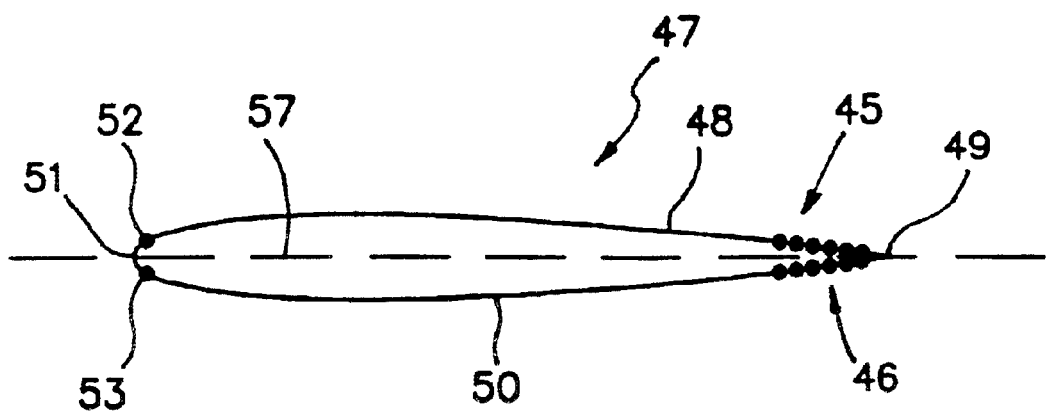
FIG. 2 is a schematic cross-sectional view of an airfoil incorporating principles of the present invention.

FIG. 2 illustrates an airfoil 47 of substantially the type used as an aircraft fixed wing or a helicopter rotor blade. Airfoil 47 has an upper surface 48, a lower surface 50, a trailing edge 49 and a leading edge 51. In accordance with principles of the present invention, an upper pressure transducer 52 and a lower pressure transducer 53 are positioned at or proximal to leading edge 51. Preferably, upper pressure transducer 52 is positioned above and lower pressure transducer 53 is positioned below the mean aerodynamic chord 57 of airfoil 47. An upper array of oscillating air jets 45 is disposed along top surface 48 proximal trailing edge 49. A lower array of oscillating air jets 46 is disposed along bottom surface 50, also proximal trailing edge 49. Both upper and lower arrays 45, 46 consist of a plurality of oscillating air jets, each of which are substantially identical to oscillating air jet actuator 21 shown in FIG. 1. In the preferred embodiment, arrays 45, 46 extend a distance equal to 5–8% of the chord length on both the upper and the lower surfaces of airfoil 47.

During flight of an aircraft to which airfoil 47 is attached, transducers 52, 53 operate to sense non-uniform airflow parameters associated with incipient variations in lift. Such non-uniform airflow may be in the form of gusts or shed wakes, or may result from oscillation of a control surface or other phenomenon. These sensed parameters are communicated as input signals to a processor/controller 56, comprising a processor 54 and a controller 55. Processor/controller 56 activates either the upper array 45 or lower array 46 in response to the signals to neutralize the effects of the detected non-uniform flow as is more fully discussed hereinafter.

Figure 3:
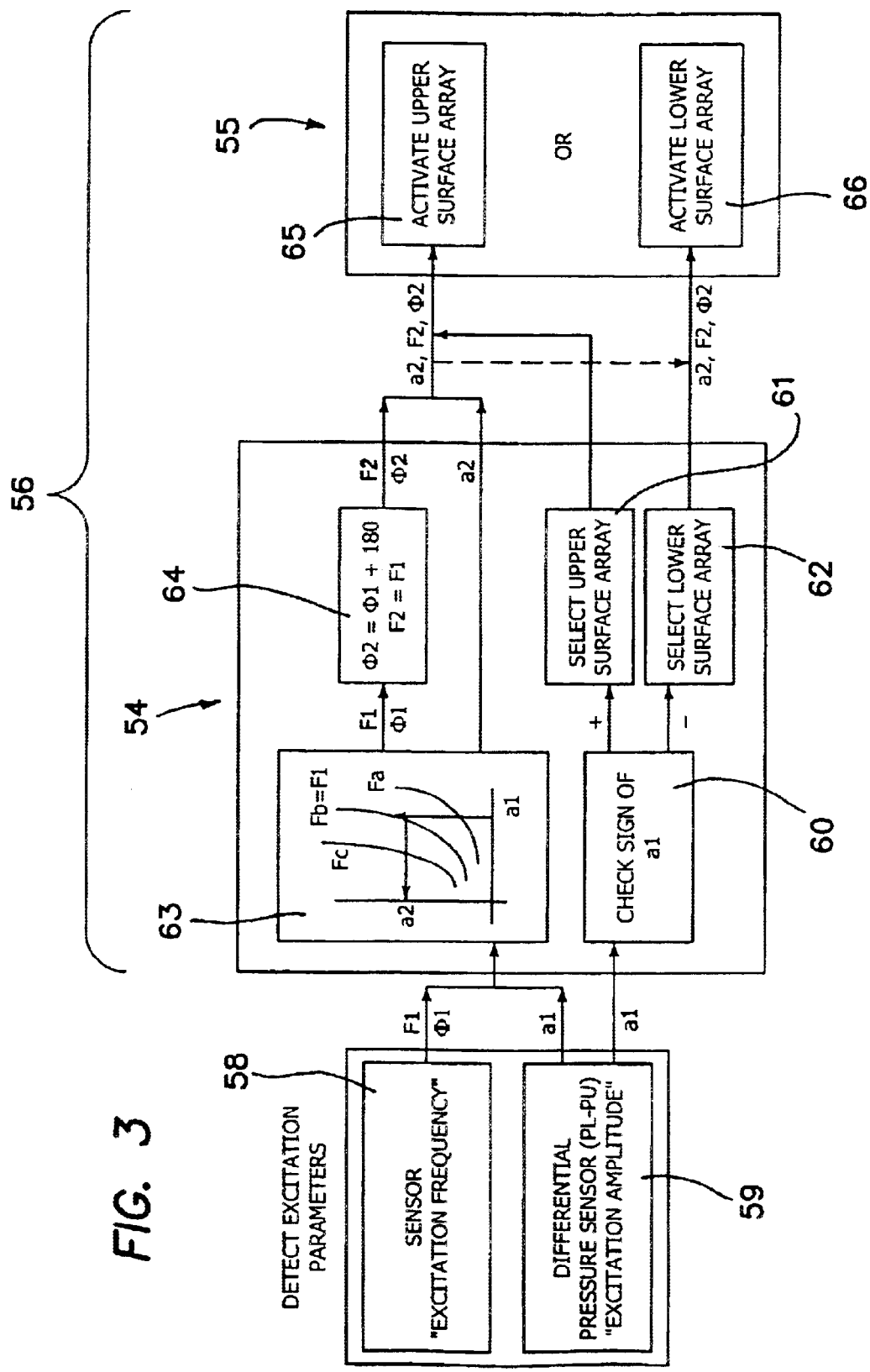
FIG. 3 is a schematic block diagram illustrating the function of a processor and controller according to the present invention.

FIG. 3 is a schematic control diagram illustrating the sensing of incipient non-uniform airflow parameters and the derivation therefrom of control commands activating arrays 45 and/or 46 for suppression of an exemplary gust-induced perturbation. As represented in block 58, transducers 52, 53 cooperate to determine the frequency F1 and phase angle φ1 of a gust or other potential perturbation.

Simultaneously, as represented in block 59, transducers 52, 53 cooperate to determine the amplitude a1 (either positive or negative) of the gust-induced mean lift force acting on the airfoil. Transducers 52 and 53 preferably comprise conventional static pressure transducers having a frequency response capable of detecting the dominant frequency of the perturbations, e.g., 60–70 Hz for gust perturbations and 1000–2000 Hz for blade vortex interactions. The location of the pressure transducers 52, 53 above and below the mean chord 51 permits the static pressure signal to be directly converted into an indicator of the lift perturbation caused by the gust. The values F1, φ1 and a1 are communicated as input signals to processor 54.

As represented in block 60, processor 54 determines the sign of a1. If the non-uniform airflow pressure (absolute) detected by lower transducer 53 exceeds that detected by upper transducer 52, the sign of a1 is positive and is indicative of an incipient increase in lift of airfoil 47. Conversely, if the non-uniform airflow pressure (absolute) detected by lower transducer 53 is less than that detected by upper transducer 52, the sign of a1 is negative and is indicative of an incipient decrease in lift of airfoil 47. As represented in block 61, if the sign of a1 is positive, a signal is generated instructing controller 55 to select for activation upper array 45. Activation of upper array 45 produces a decrease in the lift of airfoil 47 necessary to counteract the incipient positive lift perturbation. As represented in block 62, if the sign of a1 is negative, a signal is generated instructing controller 55 to select for activation lower array 46. Activation of lower array 46 produces an increase in the lift of airfoil 47 necessary to counteract the incipient negative lift perturbation.

Block 63 represents a database containing information on various system states of airfoil 47 (i.e., the overall mean lift response of the airfoil with the controller being active as a function of the amplitude of the excitation, a1 and the amplitude of the controller, a2, as a function of excitation frequency, F1). Information in the database of block 63 provides the appropriate transfer function such that for the sensed values of a1 and F1, the proper neutralizing output amplitude a2 at which array 45 or array 46 is to oscillate is output to array 45 or 46.

As represented in block 64, a neutralizing output phase angle φ2 at which array 45 or array 46 is to oscillate is calculated. For effective excitation neutralization, the instantaneous frequency of the neutralizing output should equal the excitation frequency and should lag the excitation by 180 degrees. That is, a phase lag of 180 degrees should exist between excitation phase angle φ1 and the output phase angle φ2. Thus, as shown in block 64, a neutralizing output frequency F2 at which array 45 or array 46 is to oscillate is set to the value of the perturbation frequency F1. Alternatively, processor 54 may include a spectrum analyzer that can determine the dominant frequency of the perturbation to which F2 may be set. The values F2, φ2 and a2 are communicated as inputs to controller 55.

As represented in block 65, if controller 55 receives the signal generated in block 61 indicative of an incipient lift-increasing perturbation, controller 55 activates upper array 45. The oscillatory output of upper array 45 corresponds to F2, φ2 and a2 and effects a decrease in the coefficient of lift of airfoil 47. As represented in block 66, if controller 55 receives the signal generated in block 62 indicative of an incipient lift-decreasing perturbation, controller 55 activates lower array 46. The oscillatory output of lower array 46 corresponds to F2, φ2 and a2 and effects an increase in the coefficient of lift of airfoil 47.

Figure 4A:
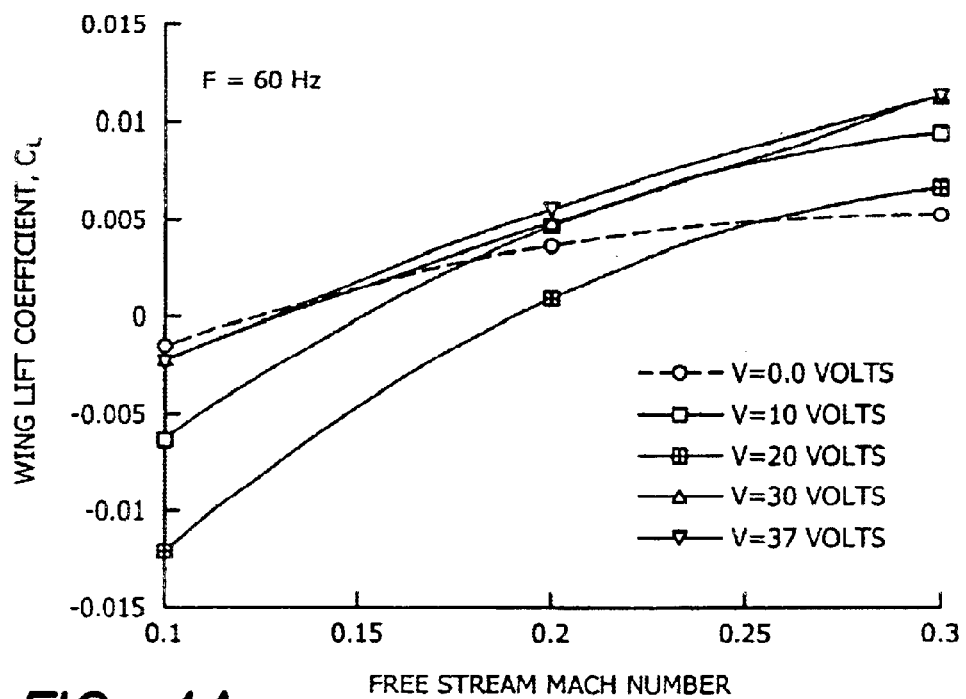
FIGS. 4(a) through 9(c) illustrate results obtained during wind tunnel testing and from computational fluid dynamics simulations of airfoils incorporating features of the present invention.
Figure 4B:
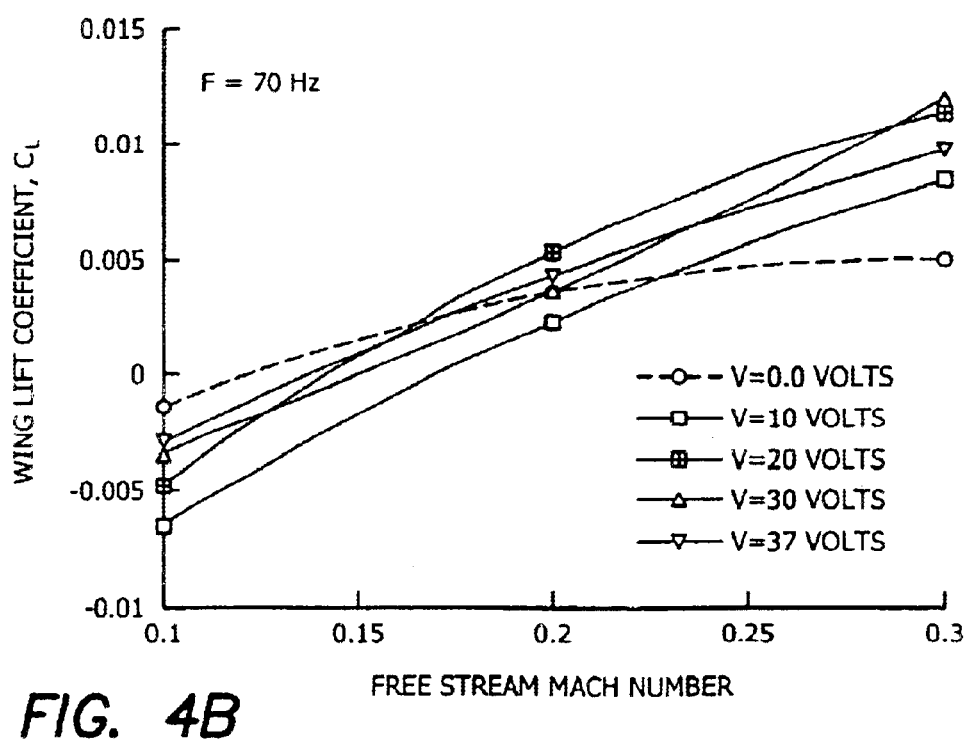

FIGS. 4(a) and 4(b) graphically depict wind tunnel data illustrating the effects of free stream Mach number (Minf), normalized peak jet velocity (vn), and jet oscillation frequency (F), on the measured mean sectional lift values for a rectangular wing. The results are shown for a wing having an aspect ratio of 7.37 and characteristics of a NACA-0012 airfoil. The airfoil had forty-two spanwise oscillating air jet arrays, separated one inch apart, with each array comprised of four oscillating air jets between x/C=0.54 and x/C=0.61 on the lower surface of the wing, where x/C is displacement x as a percentage of chord length C. When considering the sum of the diameters of the four jets over the overall chordwise extent of the array of oscillating air jets, the calculated surface porosity was approximately equal to 40%. For the baseline wing (i.e., with no active control being applied), the non-zero sectional lift values at a zero degree angle of attack are attributed to the error in precisely setting the model angle of attack in the wind tunnel.

Figure 5:
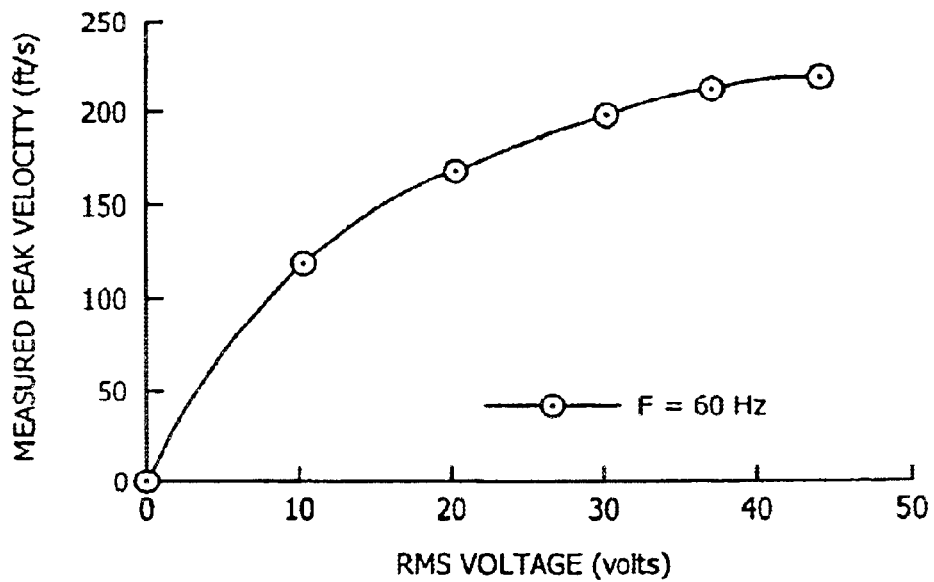

FIG. 5 illustrates the measured oscillating air jet mean velocities at a point normal to the oscillating air jet exit plane displaced 0.157 inch above the exit plane and along the centerline of the jet. The velocities are shown as a function of RMS voltage (or equivalently diaphragm displacement) for a frequency of 60 Hz. The measured velocities were obtained using a 0.12 inch diameter pitot tube (United Sensor model PAC-12-KL) in quiescent flow. Differential pressures were measured using a pressure transducer (model DSA 3018/16-PX-1PSID) with accuracy including linearity, hysteresis, and repeatability of +/−1 psid. Scanning of the pressure signal was performed at a rate of 200 samples/second, i.e., higher than the maximum frequency of 100 Hz for the oscillating air jet. The jet mean velocity was then computed using an expression of the Bernoulli equation. At the maximum measured peak velocity of 220 ft/s, the error in the calculated velocity (corresponding to the sum of the maximum allowable errors in both the static and total pressure values) was equal to +/−1 ft/s.

Figure 6A:
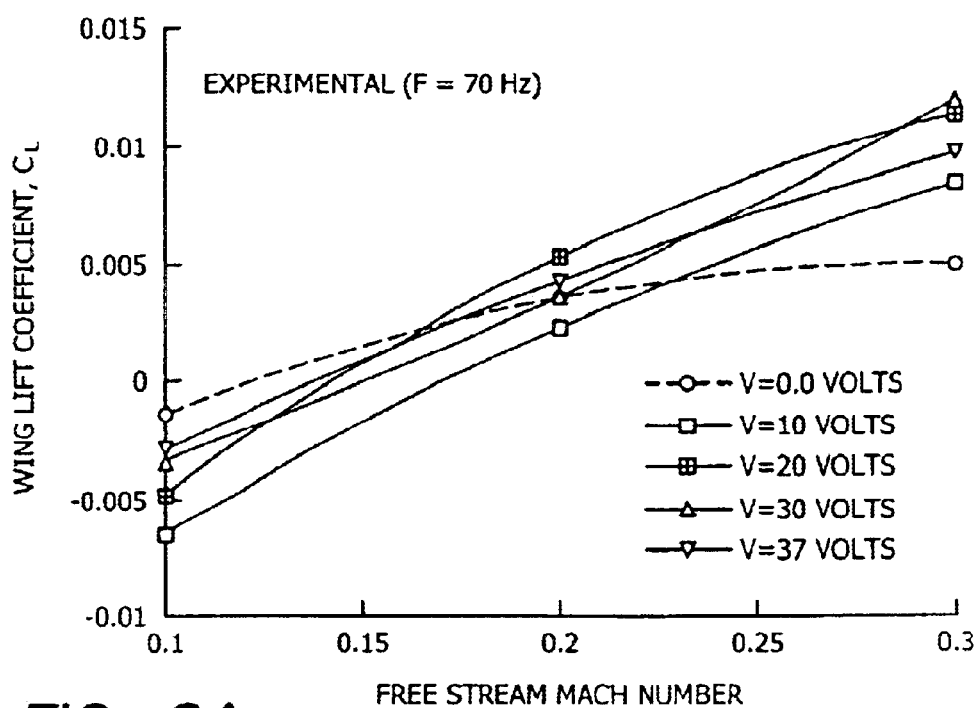
Figure 6B:
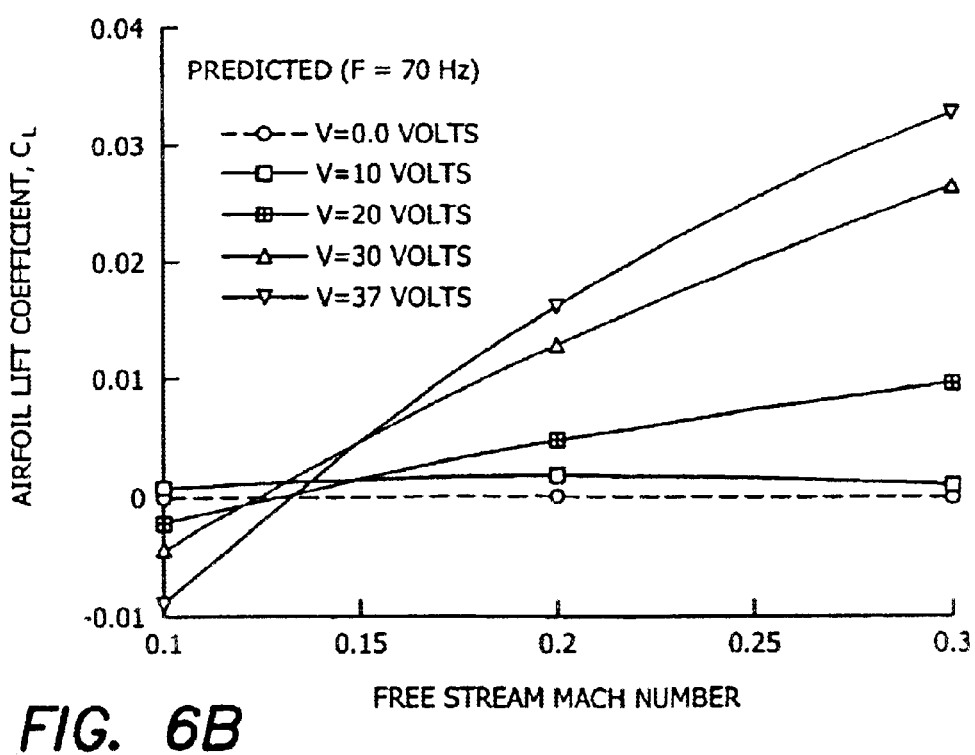

FIGS. 6(a) and 6(b) depict comparisons between the measured (3-D) and the predicted (2-D) mean sectional lift values as a function of Minf, vn and F for an angle of attack of zero degrees. With the exception of the levels of the mean lift values, all the trends observed in the measured data are reproduced through predictions. The magnitude of the shift, especially at Minf=0.30, is attributed to the turbulence model used in the predictions and to the fact that the aspect ratio is not identical for both wings (i.e., an infinite aspect ratio is implied for the 2-D predictions, and a finite aspect ratio of 7.37 is used for the wind tunnel model). Numerical studies indicate that attainment of higher lift levels is possible with the increase in the number of oscillating air jets per unit array length (i.e., porosity) and/or through increasing the peak jet velocity (and hence the magnitude of the external jet momentum).

Numerical simulations based on the solutions to the 2-D Navier-Stokes (NS) equations were performed to predict how gust alleviation/flutter suppression is achieved using oscillating jets in accordance with the present invention. Having established the relative accuracy of the numerical prediction method, we present results that illustrate the benefits of using two oscillating air jet arrays for gust alleviation/flutter suppression on the NACA-0012 airfoil. For brevity, we demonstrate the benefits of the device when activating it only on one surface (i.e., the upper) of the airfoil (blade/wing). In the numerical simulations, five individual jets clustered over 5% of the airfoil chord comprised one of the two oscillating air jet arrays. The two arrays are placed on the upper and lower surfaces of the airfoil between the nondimensional chord positions of x/C=0.93 and x/C=0.98. All simulations were conducted using a 2-D, time-accurate NS flow solver assuming fully turbulent flow. To simulate the beneficial effects of the device, a modified boundary condition was implemented into the flow solver to allow for the modeling of the oscillating jet velocities at the user-prescribed locations of the jets. The instantaneous jet velocities were prescribed using a harmonic function, viz., $$q(T)=vn*\sin(2\Pi fT).$$

Figure 7:
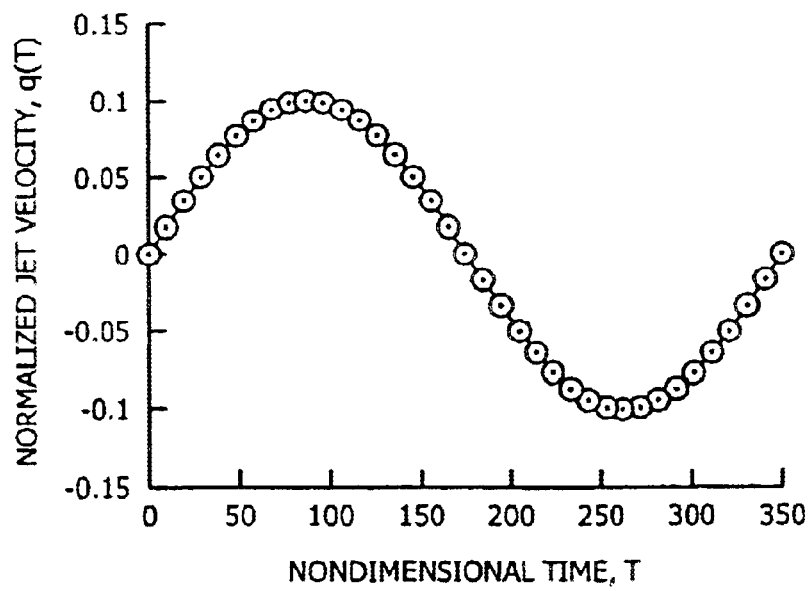

FIG. 7 depicts a typical prescribed transpiration boundary condition for the jets. In the simulations, all jets (whether for the exciter or for the controller) were assumed to operate in unison without phase shift. For convenience, the nondimensional time required for one complete jet oscillation cycle is set equal to 1. All calculations for the baseline airfoil with the aerodynamic-driven forcing (uncontrolled problem) and for the airfoil incorporating principles of the present invention (controlled problem) were formed for a Reynolds number of 3 million and a forcing frequency of 70 Hz.

Figure 8A:
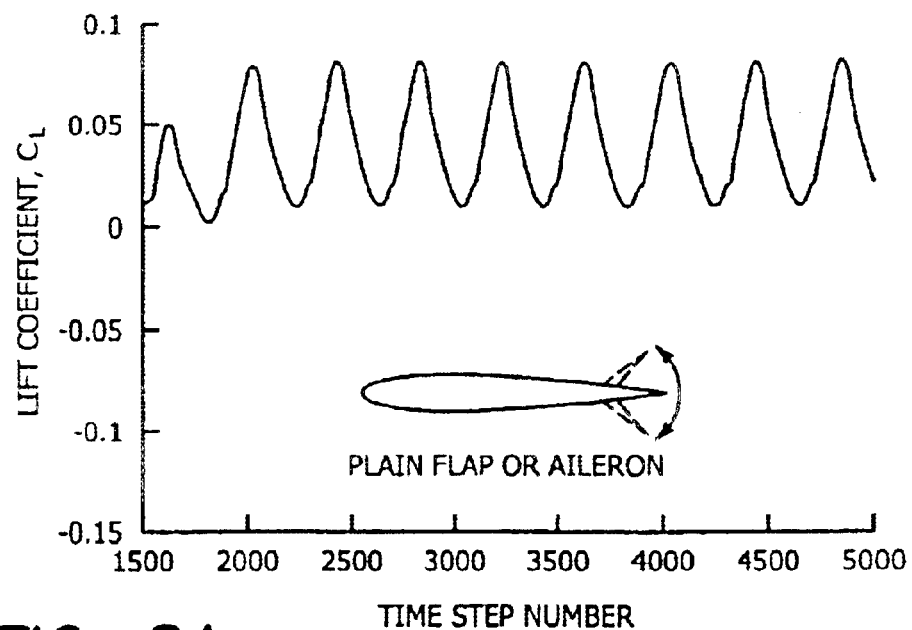
Figure 8B:
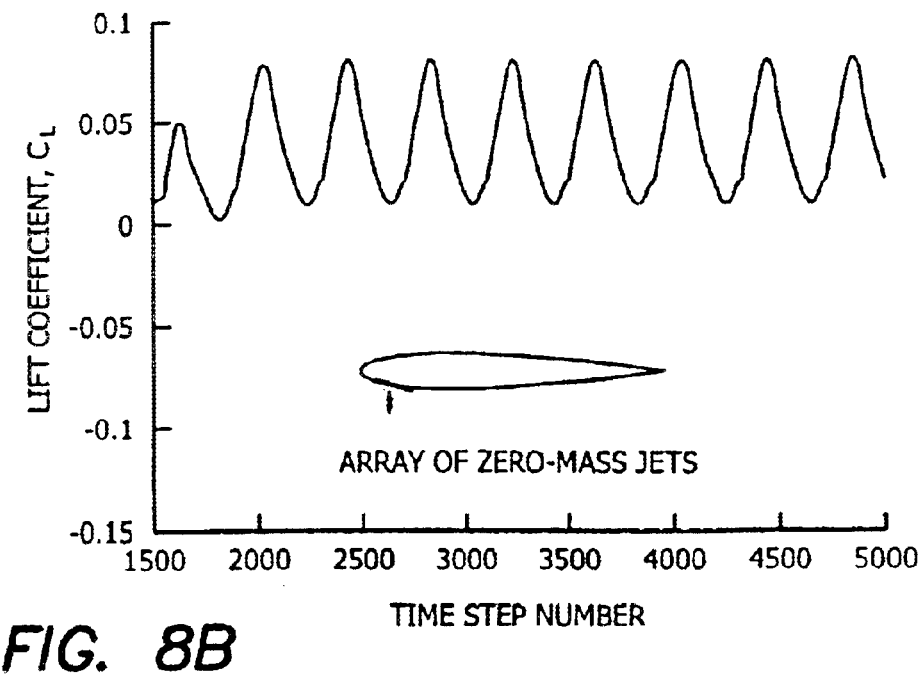

To simulate the airfoil's unsteady aerodynamic response that results, from interaction with free stream gusts or from small oscillations of a trailing edge flap, as shown in FIG. 8(a), we artificially create this response through the use of an exciter comprised of an array of oscillating air jets placed on the lower surface of the airfoil near its leading edge, as shown in FIG. 8(b). Note that this is only an artificial mean for generating the unsteady aerodynamic response (hence the forcing excitation) similar to that shown in FIGS. 8(a) and 8(b). FIG. 6(b) indicates that positive mean sectional lift values are obtained for an array of exciter oscillating air jets located on the lower surface of the wing. Conversely, negative lift values will be obtained should the array of exciter oscillating air jets be placed on the upper surface of the wing.

In the absence of the induced excitation, the mean lift level is zero (due to the geometric symmetry of the NACA-0012 airfoil and the zero degree angle of attack). Therefore, the objective here is to demonstrate that the present invention is able to restore the non-zero mean lift value shown in FIGS. 8(a) and 8(b) to the baseline airfoil value of zero. Depending on the sign of the mean lift value for the excitation, either the upper or the lower surface array of controller oscillating air jets placed in the vicinity of the airfoil's trailing edge need be activated. For example, in FIGS. 8(a) and 8(b) the sign of the mean lift is positive. This necessitates the activation of the upper surface array of controller oscillating air jets to neutralize the positive mean lift induced by the exciter. Conversely, should an array of exciter oscillating air jets be used on the upper surface to induce the excitation, it is necessary to activate the lower surface array of controller oscillating air jets.

Figure 9A:
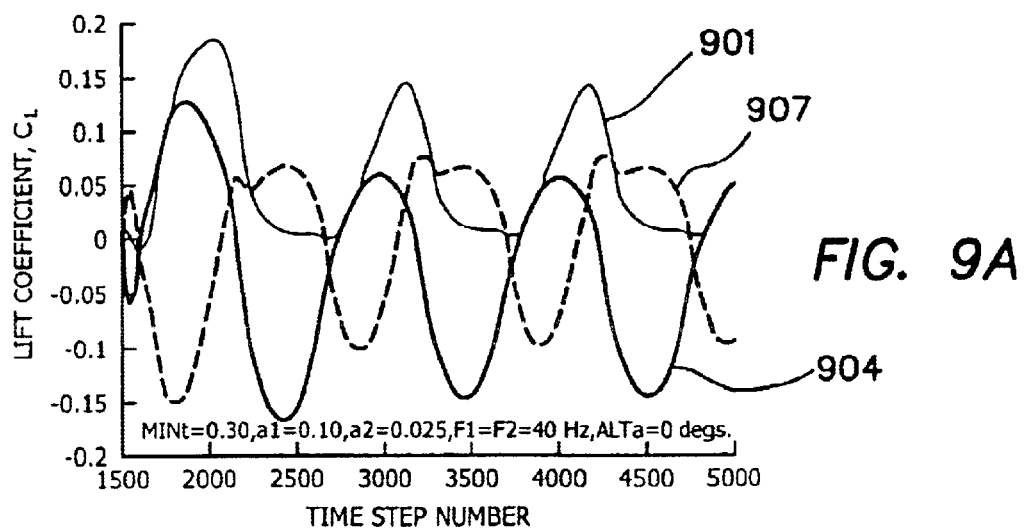
Figure 9B:
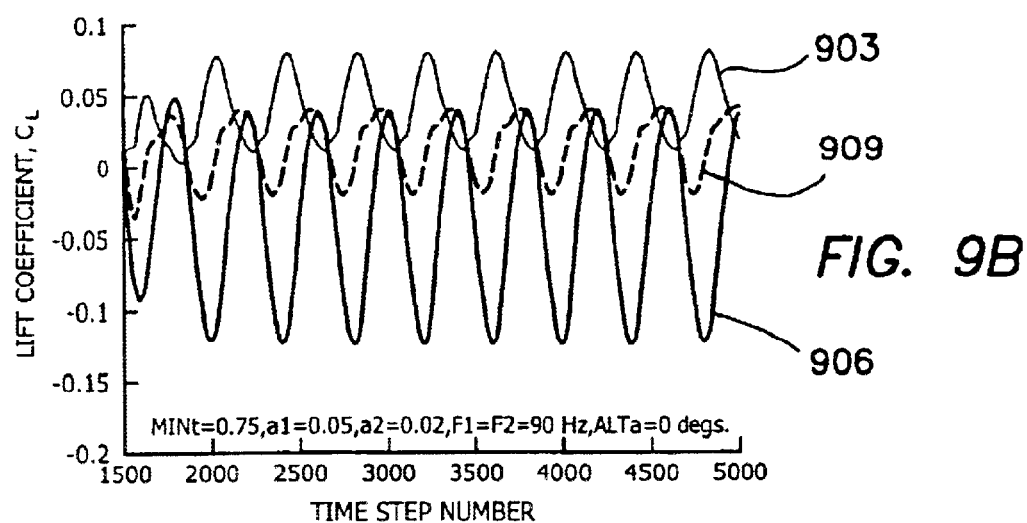
Figure 9C:
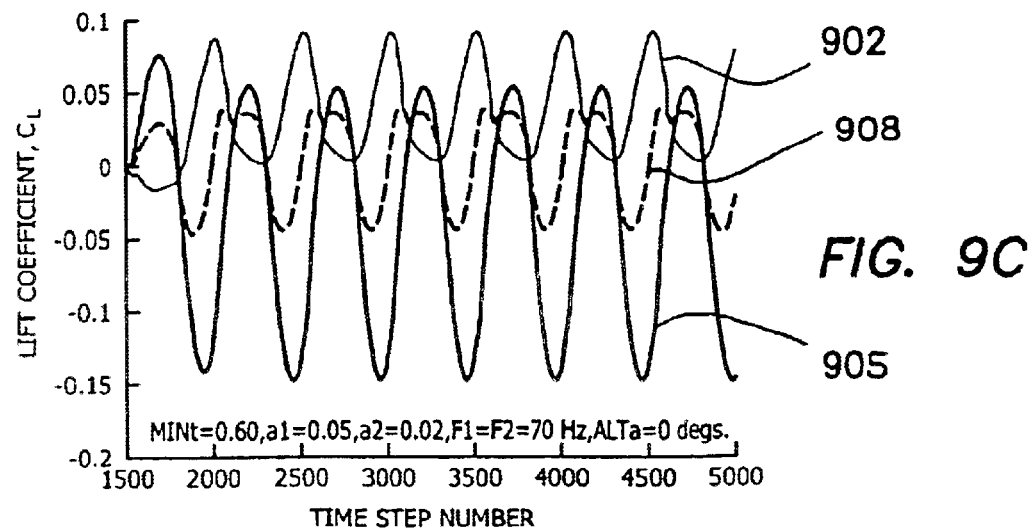

FIGS. 9(a), 9(b) and 9(c) illustrate the predicted unsteady lift responses of the NACA-0012 airfoil, for free stream Mach numbers of 0.30, 0.60 and 0.75 respectively. Shown in the figures are the computed induced responses caused by the exciter alone (indicated by the thinner continuous line) references 901, 902, 903, the responses caused by the controller alone (indicated by the thicker continuous line) references 904, 905, 906, and the responses for the simultaneous activation of the exciter and controller (indicated by the broken line) references 907, 908, 909. The figures clearly indicate that the restoration of the sectional mean lift values induced by the exciter to the nominal baseline airfoil value of zero is possible with the careful adjustment of the amplitude of the controller.

Various modifications and alterations of the above described invention will be apparent to those skilled in the art. For example, arrays 45, 46 are not limited to placement proximal the trailing edge of airfoil 47. In addition, the oscillating air jet assemblies may comprise oscillating piezoelectric diaphragms, such as disclosed in FIG. 1, or, alternatively, may comprise other means, such as electromagnetic actuated diaphragms and/or pistons, oscillating diverter valves or other conventional means for generating an oscillating air jet. In addition, sensory means known in the art can be substituted for pressure transducers 52, 53. In addition, each aperture in an oscillating jet array may correspond to a single diaphragm or there may be a single diaphragm per array. In addition, a feed-back control loop can be added to processor 54 to iteratively determine the amplitude a2 that guarantees the exact attainment of the nominal sectional lift level for the baseline airfoil. Accordingly, the foregoing detailed description of the preferred embodiment of the invention should be considered exemplary in nature and not as limiting to the scope of the invention as set forth in the following claims.

What is claimed is:

1. An active control device for improving air flow characteristics in a vicinity of an airfoil, the airfoil having an outer aerodynamic surface and an interior volume, the airfoil having a chord of predetermined length, the aerodynamic surface comprising a leading edge and a trailing edge, the active control device comprising:

a plurality of apertures disposed on the outer aerodynamic surface, said plurality of apertures communicating the outer aerodynamic surface to the interior volume and all of said plurality of apertures being disposed closer to said trailing edge than to said leading edge;

a chamber disposed within the interior volume, said chamber defining a volume in fluid communication with said apertures;

a plurality of diaphragms defining a wall of said chamber, said plurality of diaphragms each being movable between a first position and a second position, wherein movement of each of said diaphragms from said first position to said second position pushes air present in the interior volume through said plurality of apertures and but of the interior volume, and wherein movement of each of said diaphragms from said second position to said first position draws air through said plurality of apertures and into the interior volume;

a controller operatively coupled to said plurality of diaphragms, said controller controlling movement of said plurality of diaphragms; and first and second sensors operatively coupled to said controller, said first and second sensors disposed on the aerodynamic surface, said first and second sensors measuring a flow characteristic of air proximal to said first and second sensors;

a total number of said plurality of apertures corresponding to a total number of said plurality of diaphragms, and each of said plurality of diaphragms pushing and drawing air through a corresponding one of said plurality of apertures;

wherein said controller regulates an oscillation amplitude of at least one of said plurality of diaphragms in response to said flow characteristic of air measured by said first and second sensors.

2. An active control device in accordance with claim 1, wherein:

said controller regulates an oscillation frequency of at least one of said plurality of diaphragms in response to said flow characteristic of air measured by said first and second sensors.

3. A system in accordance with claim 1, wherein:

said first and second sensors comprise at least one pressure transducer.

4. A method of neutralizing perturbations caused by non-uniform flow of a fluid stream over an airfoil having a leading edge and a trailing edge, the method comprising:

sensing a variable pressure associated with the fluid stream proximal the leading edge of the airfoil;

computing a perturbation frequency associated with said variable pressure; and actuating an array of oscillating jets disposed proximal the trailing edge of said airfoil to cause said oscillating jets to oscillate at an actuating frequency, said actuating frequency being a function of said perturbation frequency.

5. The method of claim 4, further comprising:

computing a dominant frequency associated with said variable pressure and causing said oscillating jets to oscillate at an actuating frequency substantially equal to said dominant frequency.

6. The method of claim 4, further comprising:

sensing a variable differential pressure associated with said fluid stream; and actuating one of a first and second array of oscillating jets disposed on an upper and lower surface of said airfoil in response to the arithmetic sign of said differential pressure.

7. An active control device for improving air flow characteristics in a vicinity of an airfoil, the airfoil having an outer aerodynamic surface and an interior volume, the airfoil having a chord of predetermined length, the aerodynamic surface comprising a leading edge and a trailing edge, the active control device comprising:

a plurality of apertures disposed on the outer aerodynamic surface, said plurality of apertures communicating the outer aerodynamic surface to the interior volume;

a chamber disposed within the interior volume, said chamber defining a volume in fluid communication with said apertures;

a plurality of diaphragms defining a wall of said chamber, said plurality of diaphragms each being movable between a first position and a second position, wherein movement of each of said diaphragms from said first position to said second position pushes air present in the interior volume through said plurality of apertures and out of the interior volume, and wherein movement of each of said diaphragms from said second position to said first position draws air through said plurality of apertures and into the interior volume;

a controller operatively coupled to said plurality of diaphragms, said controller controlling movement of said plurality of diaphragms; and first and second sensors operatively coupled to said controller, said first and second sensors disposed on the aerodynamic surface, said first and second sensors measuring a flow characteristic of air proximal to said first and second sensors;

said controller regulating an oscillation amplitude of at least one of said plurality of diaphragms in response to said flow characteristic of air measured by said first and second sensors;

wherein a total number of said plurality of apertures corresponds to a total number of said plurality of diaphragms, and each of said plurality of diaphragms pushes and draws air through a corresponding one of said plurality of apertures.

* * * * *